(12) United States Patent
Zhang et al.

(10) Patent No.: US 8,505,392 B2
(45) Date of Patent: Aug. 13, 2013

(54) MOBILE PLATFORM WITH SIX DEGREES OF FREEDOM

(75) Inventors: Guo-Qing Zhang, Shenzhen (CN); Chia-Peng Day, Santa Clara, CA (US); Xiao-Ming Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/114,198

(22) Filed: May 24, 2011

(65) Prior Publication Data

US 2012/0048156 A1    Mar. 1, 2012

(30) Foreign Application Priority Data

Aug. 31, 2010 (CN) .......................... 2010 1 0267976

(51) Int. Cl.
*G01D 7/00* (2006.01)
*G01B 5/004* (2006.01)

(52) U.S. Cl.
USPC .................... 73/862.043; 73/862.041; 33/503

(58) Field of Classification Search
USPC ...... 73/862.041, 862.043; 33/503; 74/479.01
See application file for complete search history.

(56) References Cited

U.S. PATENT DOCUMENTS

| | | | | |
|---|---|---|---|---|
| 5,114,300 A | * | 5/1992 | Shahinpoor et al. | 414/729 |
| 5,263,382 A | * | 11/1993 | Brooks et al. | 74/471 XY |
| 5,354,158 A | * | 10/1994 | Sheldon et al. | 409/201 |
| 5,419,008 A | * | 5/1995 | West | 16/25 |
| 5,489,168 A | * | 2/1996 | Sheldon et al. | 409/235 |
| 5,538,373 A | * | 7/1996 | Kirkham | 409/131 |
| 5,568,993 A | * | 10/1996 | Potzick | 403/128 |
| 5,870,834 A | * | 2/1999 | Sheldon | 33/556 |
| 6,021,579 A | * | 2/2000 | Schimmels et al. | 33/645 |
| 6,099,217 A | * | 8/2000 | Wiegand et al. | 409/201 |
| 6,223,604 B1 | * | 5/2001 | Fronczak et al. | 73/856 |
| 6,330,837 B1 | * | 12/2001 | Charles et al. | 74/490.06 |
| 6,974,297 B2 | * | 12/2005 | Brogårdh | 414/680 |
| 7,040,033 B2 | * | 5/2006 | Zhu et al. | 33/502 |
| 7,623,082 B2 | * | 11/2009 | Meschini | 343/761 |
| 7,810,248 B2 | * | 10/2010 | McMurtry | 33/503 |
| 7,971,496 B2 | * | 7/2011 | Ehrenleitner | 73/862.621 |
| 2003/0005786 A1 | * | 1/2003 | Stuart et al. | 74/479.01 |
| 2003/0106230 A1 | * | 6/2003 | Hennessey | 33/645 |
| 2004/0028516 A1 | * | 2/2004 | Brogardh | 414/735 |
| 2004/0083830 A1 | * | 5/2004 | Nashiki et al. | 73/865.9 |

(Continued)

FOREIGN PATENT DOCUMENTS

| CN | 2677679 Y | 2/2005 |
|---|---|---|
| CN | 201153012 Y | 11/2008 |
| CN | 201180735 Y | 1/2009 |

*Primary Examiner* — Lisa Caputo
*Assistant Examiner* — Jonathan Dunlap
(74) *Attorney, Agent, or Firm* — Altis Law Group, Inc.

(57) ABSTRACT

A mobile platform with six degrees of freedom includes a static base plate, six branched chain, a dynamic moving plate and twelve fixing assembly. Each of the static base plate and the dynamic moving plate defines six spherical ball sockets. The dynamic moving plate is adjustably and movably mounted upon the static base plate. The six branched chains is adjustably assembled between the static base plate and the dynamic moving plate, enabling the dynamic moving plate to move relative to the static base plate along six degrees of freedom. Each branched chain comprises two ball heads rotatably engaged with one corresponding ball socket of the static base plate and one corresponding ball socket of the dynamic moving plate.

9 Claims, 4 Drawing Sheets

(56) References Cited

U.S. PATENT DOCUMENTS

| | | | |
|---|---|---|---|
| 2004/0149065 A1* | 8/2004 | Moran | 74/490.04 |
| 2006/0241810 A1* | 10/2006 | Zhang et al. | 700/245 |
| 2007/0284502 A1* | 12/2007 | Hsin et al. | 248/495 |
| 2008/0093322 A1* | 4/2008 | Ehrenleitner | 212/274 |
| 2008/0258987 A1* | 10/2008 | Meschini | 343/761 |
| 2009/0297257 A1* | 12/2009 | McMurtry | 403/122 |
| 2010/0058602 A1* | 3/2010 | McMurtry | 33/503 |
| 2010/0268250 A1* | 10/2010 | Stuart et al. | 606/130 |
| 2011/0308296 A1* | 12/2011 | Sasso et al. | 73/1.77 |

\* cited by examiner

MOBILE PLATFORM WITH SIX DEGREES OF FREEDOM

BACKGROUND

1. Technical Field

This disclosure relates to mobile platforms, and particularly, to a mobile platform which has six degrees of freedom.

2. Description of Related Art

Presently, mobile platforms with six degrees of freedom are widely used in many fields to perform testing in manually simulated environments, such as the simulation of flight conditions, the simulation of sailing conditions, and the like. A commonly used mobile platform with six degrees of freedom generally includes a static base plate, six branched chains, and a dynamic moving plate. The six branched chains are all stretchable, and are all assembled between the static base plate and the dynamic moving plate. Two ends of each branched chain are respectively rotatably connected to the static base plate and the dynamic moving plate by a pair of spherical hinges.

However, the existing mobile platform with six degrees of freedom cannot be easily adjusted, and is difficult to position precisely. In addition, the spherical hinges of the existing mobile platform with six degrees of freedom easily wear out and damage with use.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the mobile platform with six degrees of freedom. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
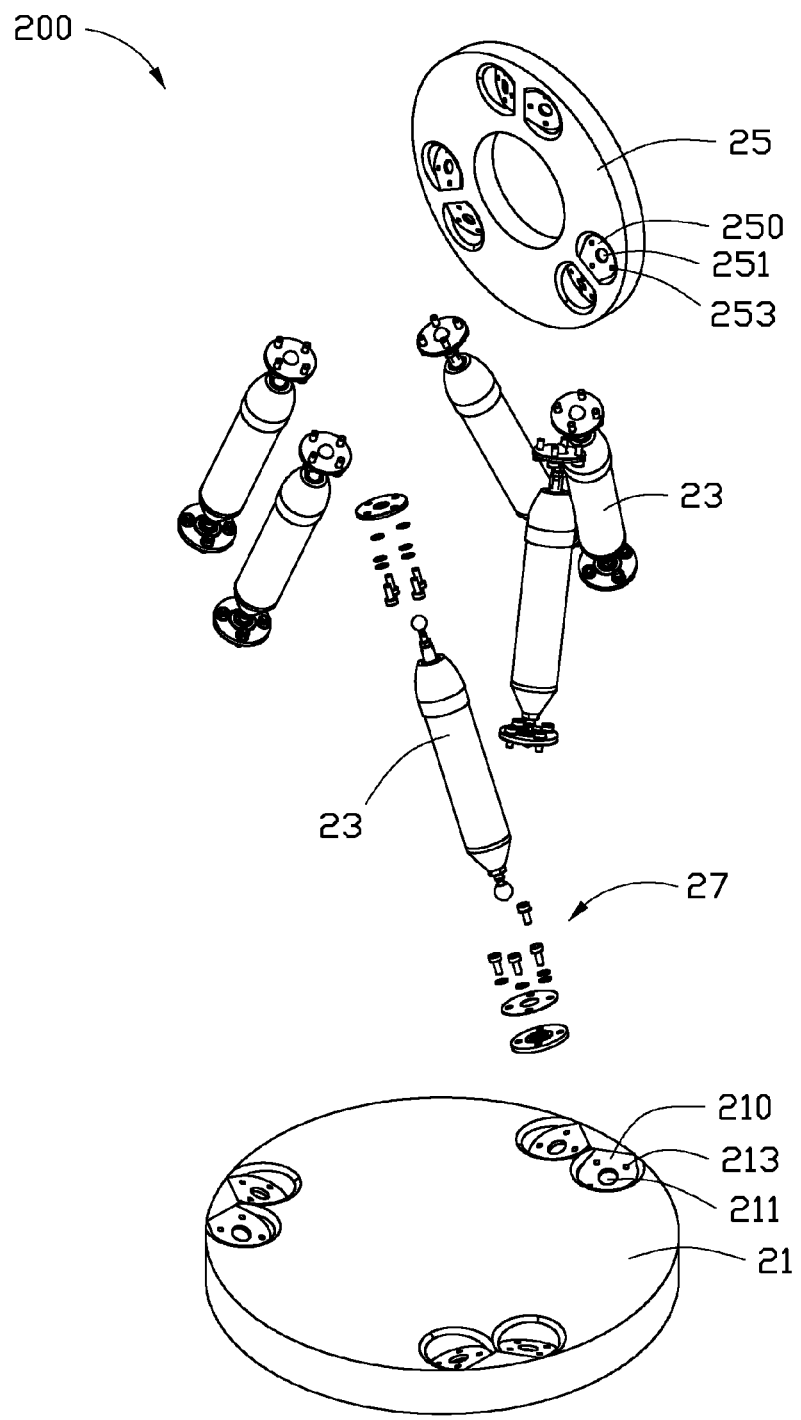
FIG. 1 is an exploded perspective view of an embodiment of a mobile platform, the platform including a static base plate, six branched chains, a dynamic moving plate, and twelve pairs of fixing assemblies.
Figure 2:
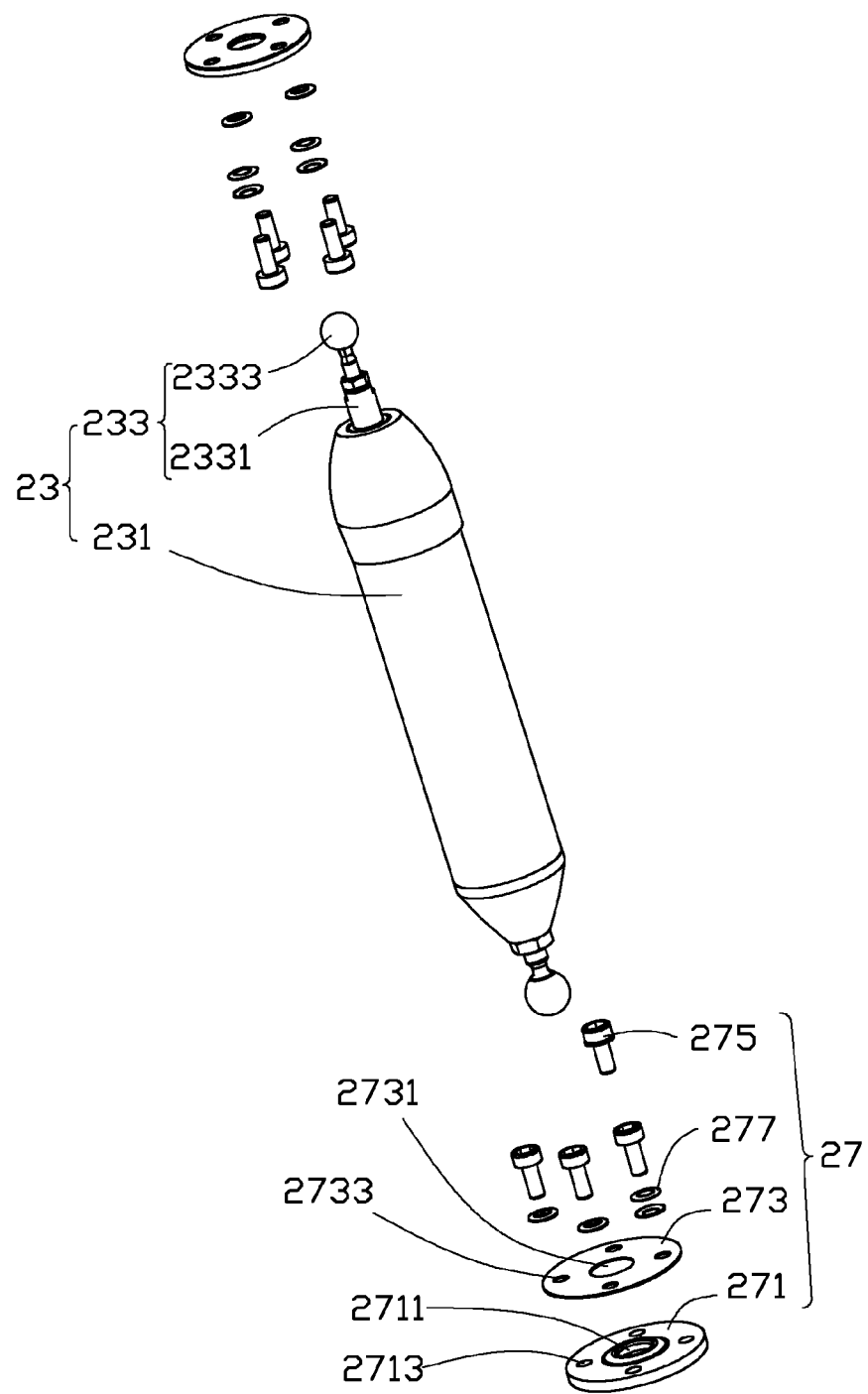
FIG. 2 is an exploded perspective view of the branched chains and fixing assemblies of the mobile platform with six degrees of freedom of FIG. 1.

Referring to FIGS. 1 and 2, an embodiment of a mobile platform with six degrees of freedom 200 is shown. The platform 200 includes a static base plate 21, six branched chains 23, a dynamic moving plate 25, and twelve fixing assemblies 27. The dynamic moving plate 25 is mounted upon the static base plate 21. All the branched chains 23 are stretchable, and are adjustably assembled between the static base plate 21 and the dynamic moving plate 25, for enabling the dynamic moving plate 25 to move relative to the static base plate 21 along six degrees of freedom. Two ends of each branched chain 23 are respectively rotatably and adjustably assembled to the static base plate 21 and the dynamic moving plate 25 by means of the fixing assemblies 27.

The static base plate 21 is a substantially circular plate in one embodiment. Six assembly recesses 210 are defined in one surface of the static base plate 21. In one embodiment, the six assembly recesses 210 are divided into three pairs that are evenly distributed on a periphery of the static base plate 21. Each pair of the assembly recesses 210 are two assembly recesses 210 positioned adjacent to each other. Each assembly recess 210 defines a spherical ball socket 211 on a bottom surface (not labeled) thereof for connection to the corresponding one end of one branched chain 23. A plurality of fixing holes 213 are defined in the bottom surface of each recess 210 and positioned around the ball socket 211. In one embodiment, there are four fixing holes 213.

The dynamic moving plate 25 has substantially the same shape as the static base plate 21. The dynamic moving plate 25 also defines six assembly recesses 250 in one surface thereof corresponding to the six assembly recesses 210 of the static base plate 21. A spherical ball socket 251 is formed on a bottom surface (not labeled) of each assembly recess 250 for connecting to the corresponding other end of one branched chain 23. A plurality of fixing holes 253 are defined in the bottom surface of each recess 251 of the dynamic moving plate 25, and are positioned around the corresponding ball socket 251. In one embodiment, there are four fixing holes 253.

Figure 3:
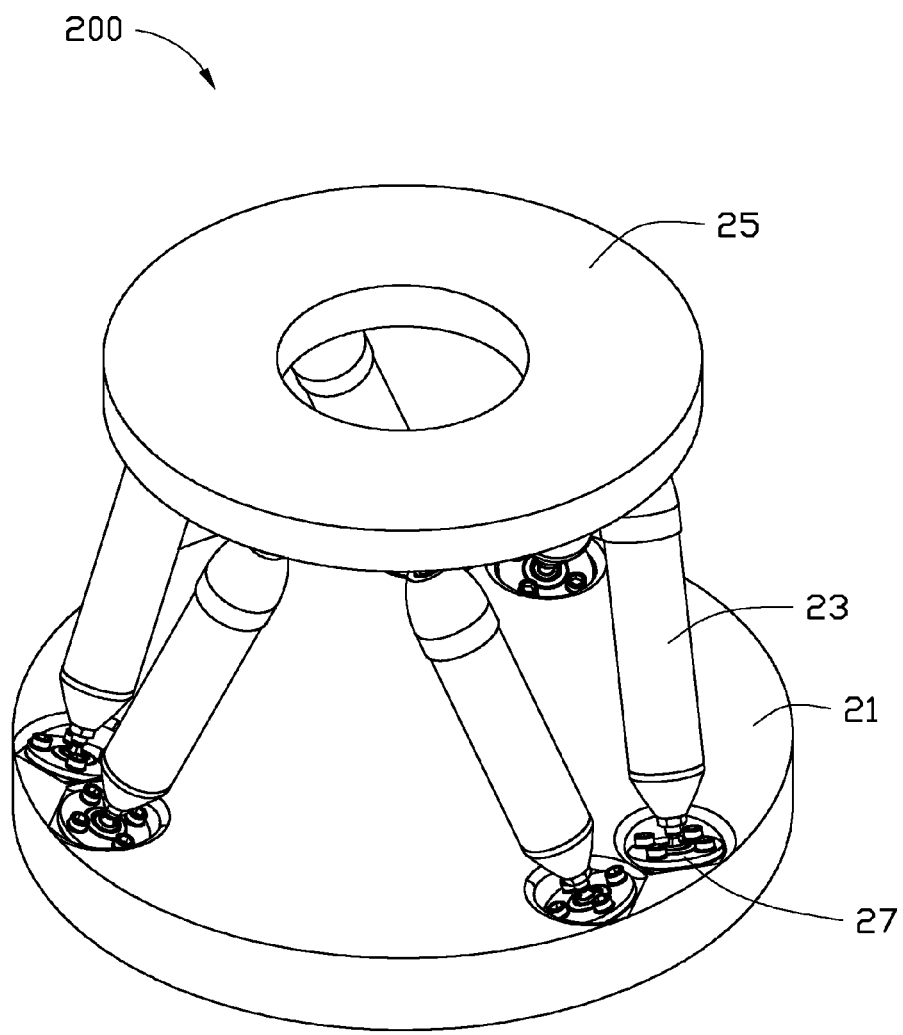
FIG. 3 is an assembled perspective view of the mobile platform with six degrees of freedom of FIG. 1.
Figure 4:
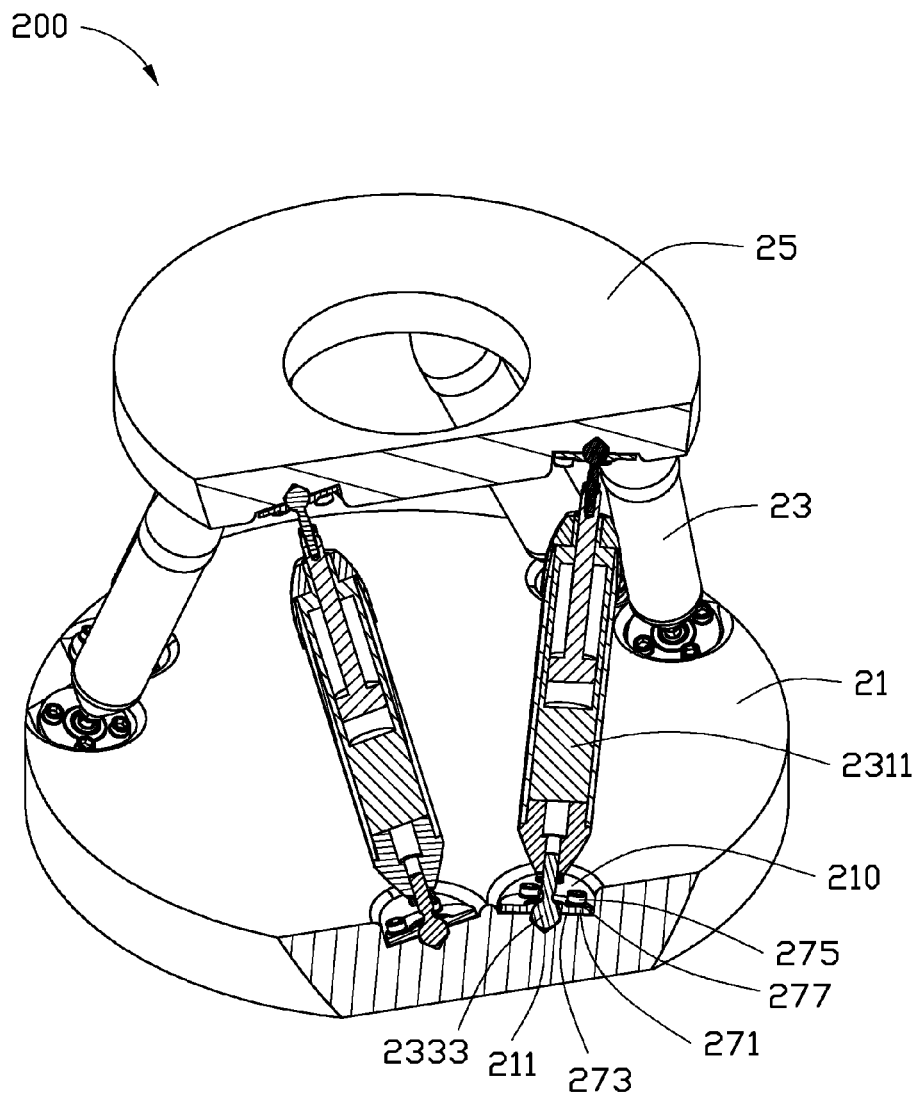
FIG. 4 is a side cross-sectional, isometric view of the mobile platform with six degrees of freedom of FIG. 1.

Also referring to FIGS. 3 and 4, each branched chain 23 includes a main body 231 and two assembly portions 233 adjustably and slidably mounted to two ends of the main body 231. The main body 231 is substantially a hollow cylinder body having a cylinder 2311 assembled therein. Each assembly portion 233 includes a connecting rod 2331 and a ball head 2333 formed at a distal end of the connecting rod 2331. In one embodiment, the connecting rod 2331 is mounted to the cylinder 2311, and is driven by the cylinder 2311 to slide axially relative to the main body 231. The ball head 2333 has substantially the same shape as the ball sockets 211, 251, so that two ends of the corresponding branched chain 23 can be respectively rotatably connected to the static base plate 21 and the dynamic moving plate 25.

The twelve fixing assemblies 27 are mounted to one corresponding end of the branched chain 23 and fixed to one corresponding assembly recess 210 or assembly recess 250. Each fixing assembly 27 includes a ball cover 271, a seal 273, a plurality of fixing components 275, and a plurality of elastic components 277. The ball cover 271 is a substantially circular piece, and defines a circular hole 2711 and a plurality of guiding holes 2713 surrounding the circular hole 2711. In one embodiment, there are four guiding holes 2713 corresponding to the four fixing holes 213, 253 of the base plate 21 or dynamic moving plate 25. The circular hole 2711 has a diameter less than the diameter of the ball head 2333, but greater than the diameter of the connecting rod 2331, for enabling the connecting rod 2331 to pass through while preventing the ball head 2333 from passing through. The seal 273 is made of rubber, and is sleeved on the connecting rod 2331 of the assembly portion 233 together with the ball cover 271. The seal 273 can have substantially the same shape as the ball cover 271. The seal 273 defines a sleeve hole 2731 and four guiding holes 2733 surrounding the sleeve hole 2731. In use, the ball cover 271 together with the seal 273 is sleeved on the connecting rod 2331 of one corresponding assembly portion 233 and fixed to one corresponding bottom surface of one assembly recess 210, 250 by the plurality of fixing components 275 and a plurality of elastic components 277, for covering the corresponding ball socket 211 (or 251) of the static base plate 21 (or 25). The fixing component 275 in the present embodiment is a fixing pin, and the number of the fixing component 275 is four. The elastic component 277 in the present embodiment is an elastic loop sleeved on the fixing component 275.

When assembling the platform 200, the two ball heads 2333 of each branched chain 23 are respectively inserted into and rotatably engage with one corresponding ball socket 211 of the static base plate 21 and one corresponding ball socket 251 of the dynamic moving plate 25. The twelve fixing assemblies 27 mounted to two ends of the branched chains 23 are respectively fixed to one corresponding assembly recess 210 of the static base plate 21 or assembly recess 250 of the dynamic moving plate 25, to finish the assembly of the platform 200.

In use, an operator can operate the dynamic moving plate 25 and adjust the branched chains 23 to obtain a preset working state of the platform 200, or to simulate a complex environment.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile platform with six degrees of freedom, comprising:
   a static base plate defining six spherical ball sockets on a surface thereof;
   a dynamic moving plate adjustably and movably mounted upon the static base plate, the dynamic moving plate defining six spherical ball sockets on a surface of the dynamic moving plate, and facing toward the static base plate; and
   six branched chains adjustably assembled between the static base plate and the dynamic moving plate, enabling the dynamic moving plate to move relative to the static base plate along six degrees of freedom, each of the branched chains comprising a main body, two assembly portions adjustably and slidably mounted to two ends of the main body, and two ball heads, each of the assembly portions comprising a connecting rod, and the two ball heads formed at two distal ends of the connecting rod, respectively, wherein the two ball heads of each branched chain respectively rotatably engages with one corresponding ball socket of the static base plate and one corresponding ball socket of the dynamic moving plate, each of the static base plate and the dynamic moving plate defines six assembly recesses; the spherical ball sockets are correspondingly defined in the assembly recesses; each of the fixing assemblies comprises a ball cover mounted to one corresponding distal end of the connecting rod and fixed to one corresponding assembly recess of the static base plate or the dynamic moving plate, each fixing assembly comprises a seal and a plurality of fixing components, the seal is sleeved on the connecting rod of the assembly portion together with the ball cover, and is positioned between the main body and the ball cover, each recess further defines a plurality of fixing holes surrounding the ball socket; the seal is has a substantially same shape as the ball cover, and is fixed to the corresponding assembly recess of the static base plate or the dynamic moving plate by the plurality of fixing components covering the corresponding ball socket.

2. The mobile platform with six degrees of freedom as claimed in claim 1, further comprising twelve fixing assemblies, wherein each pair of fixing assemblies are respectively mounted to two ends of each branched chain and respectively fixed to the static base plate and the dynamic moving plate.

3. The mobile platform with six degrees of freedom as claimed in claim 1, wherein the main body is a substantially hollow body having a cylinder assembled therein, and the connecting rod is mounted to and is driven by the cylinder to slide relative to the main body axially.

4. The mobile platform with six degrees of freedom as claimed in claim 1, wherein the ball cover defines a circular hole having a diameter less than a diameter of the ball head, but greater than a diameter of the connecting rod, enabling the connecting rod to pass through, while preventing the ball cover from dropping off.

5. The mobile platform with six degrees of freedom as claimed in claim 4, wherein each fixing assembly further comprises a plurality of elastic components sleeved on the plurality of fixing components enabling the fixing components to be elastically fixed to the static base plate or the dynamic moving plate.

6. The mobile platform with six degrees of freedom as claimed in claim 1, wherein the ball head has a substantially same shape as the ball socket of the static base plate and the ball socket of the dynamic moving plate.

7. A mobile platform with six degrees of freedom, comprising:
   a static base plate;
   twelve fixing assemblies;
   six branched chains; and
   a dynamic moving plate adjustably mounted upon the static base plate by the six branched chains;
   wherein, the six branched chains are stretchable and adjustably assembled between the static base plate and the dynamic moving plate, enabling the dynamic moving plate to move relative to the static base plate along six degrees of freedom, each branched chain comprises a main body and two assembly portions disposed at two ends of the main body, and the two assembly portions of each branched chain are respectively rotatably and adjustably assembled to the static base plate and the dynamic moving plate, the main body is a substantially hollow body having a cylinder assembled therein; each assembly portion comprises a connecting rod and a ball head formed at a distal end of the connecting rod; the connecting rod is mounted to and is driven by the cylinder to slide relative to the main body axially; each of the static base plate and the dynamic moving plate defines six spherical ball sockets; two ball heads of each branched chain are respectively inserted into and rotatably engaged with one corresponding ball socket of the static base plate and one corresponding ball socket of the dynamic moving plate, each pair of fixing assemblies respectively mounted to two ends of each branched chain and respectively fixed to the static base plate and the dynamic moving plate, the static base plate and the dynamic moving plate each defines six assembly recesses; the spherical ball sockets are correspondingly defined in the assembly recesses; each fixing assembly comprises a ball cover mounted to one corresponding distal end of the connecting rod and fixed to one corresponding assembly recess of the static base plate or the dynamic moving plate, the ball cover defines a circular hole with a diameter less than a diameter of the ball head, but greater than a diameter of the connecting rod, enabling the connecting rod to pass through, while preventing the ball cover from dropping off, each fixing assembly further comprises a seal sleeved on the connecting rod of the assembly portion together with the ball cover, and positioned between the main body and the ball cover, each of the recesses further defines a plurality of fixing holes surrounding the ball socket; each fixing assembly further comprises a plurality of fixing components; the seal is made of rubber, has a substantially same shape as the ball cover, and fixed to the corresponding assembly recess of the static base plate or the dynamic moving plate by the plurality of fixing components, thereby covering the corresponding ball socket.

8. The mobile platform with six degrees of freedom as claimed in claim 7, wherein the ball head has a substantially same shape as the ball socket of the static base plate and the ball socket of the dynamic moving plate, such that two ends of the corresponding branched chain can be respectively rotatably connected to the static base plate and the dynamic moving plate.

9. The mobile platform with six degrees of freedom as claimed in claim 7, wherein each fixing assembly further comprises a plurality of elastic components sleeved on the plurality of fixing components enabling the fixing components to be elastically fixed to the static base plate or the dynamic moving plate.

* * * * *